– –

United States Patent [19]

Long

[11] 3,881,972

[45] May 6, 1975

[54] CONTINUOUS PROCESS AND MACHINE

[75] Inventor: Richard L. Long, Rowland Heights, Calif.

[73] Assignee: McDonnell Douglas Corporation, Santa Monica, Calif.

[22] Filed: Oct. 2, 1973

[21] Appl. No.: 402,721

[52] U.S. Cl. ............... 156/79; 156/148; 156/177; 156/179; 161/53; 161/159; 220/9 LG; 220/9 F; 264/45.9
[51] Int. Cl. ...................... B32b 5/18; B32b 31/14
[58] Field of Search ............... 264/45; 161/159, 53; 156/79, 148, 177, 178, 174; 220/9 LG, 9 F; 425/4, 122

[56] References Cited
UNITED STATES PATENTS

| | | | |
|---|---|---|---|
| 2,495,808 | 1/1950 | Colmant | 161/55 |
| 3,257,265 | 6/1966 | Isenberg | 220/9 LG |
| 3,317,074 | 5/1967 | Barker et al. | 220/9 F |
| 3,554,824 | 1/1971 | Callahan | 156/79 X |
| 3,764,247 | 10/1973 | Garrett | 425/122 X |

*Primary Examiner*—Edward G. Whitby
*Attorney, Agent, or Firm*—Robert O. Richardson; Walter J. Jason; Donald L. Royer

[57] ABSTRACT

A continuous process and machine for manufacturing three-dimensional fiber reinforced insulation for cryogenic containers for shipping liquid natural gas. Spaced layers of open weave fabric from rolls are fed by conveyor belts past a tufting station and foaming station in making fiber reinforced insulation of rigid closed cell polyurethane planks of finite width and thickness and of infinite length.

7 Claims, 3 Drawing Figures

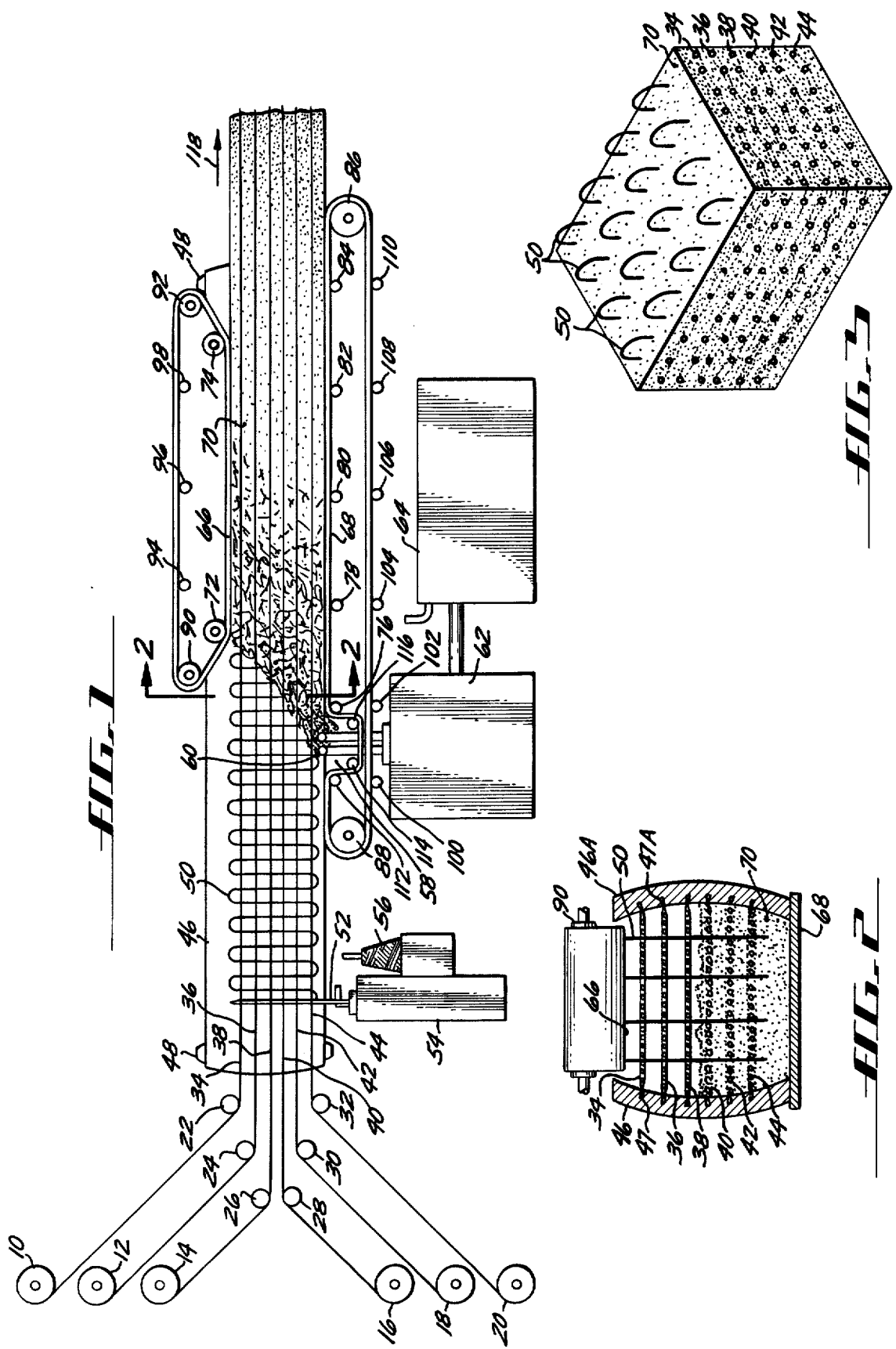

CONTINUOUS PROCESS AND MACHINE

BACKGROUND OF THE PRESENT INVENTION

Liquid natural gas can be shipped in far less space than when it is in a gaseous state. However, such shipments must be at cryogenic temperatures, requiring insulated containers. To avoid embrittlement of the metal of the containers, the insulation should be inside, thermally shielding the container hull structure from the cold temperature of the liquid natural gas. When liquid gas seeps through the insulation and warms up to a gaseous state it expands and rips insulation from the container walls. For this reason a three-dimensional fabric reinforcement has been developed which contains the insulation foam in place until the pressure has stabilized. One such insulation is disclosed in Applicant's co-pending application Ser. No. 385,313 filed Aug. 3, 1973 for Multi-Layer Cryogenic Insulation. Another is disclosed in Applicant's co-pending application Ser. No. 385,314 filed Aug. 3, 1973 for Multi-Fabric Tufted Thread Reinforced Thermal Insulation. Still another is disclosed in U.S. Pat. No. 3,317,074 issuing May 2, 1967 to Barker et al. for Cryogenic Containers.

Current methods of manufacture relate to discontinuous processes that consume large volumes of excess materials, creating a disposal problem of solid waste. Both the use and the disposal add significantly to the cost.

An endless belt assembly structure has been developed for retaining layers of open weave netting in stacked spaced relationship as they move through a series of work stations in an assembly line production. This belt assembly is the subject matter of co-pending patent application Ser. No. 402,794 filed Oct. 2, 1973. Information concerning an exemplary insulation material and the endless belt assembly may be had from these applications.

SUMMARY OF THE PRESENT INVENTION

In accordance with the present invention there is provided a low cost method of manufacture for three-dimensional fiber reinforced insulation to meet the commercial demands for this product. This is a continuous process requiring a minimum of auxiliary materials. As long as raw materials are supplied, the three-dimensional insulation is of endless length. The channelling of the matrix and polymer during the expanding and setting of the foam minimizes trimming and trimming losses. This process uses a stack consisting of several layers of properly spaced woven, knitted or equivalent fabric that possesses interstices sufficiently large to permit the easy passage of commercial tufting needles and still produce a thread spacing in the fabric sufficient to supply the required reinforcement for the three-dimensional insulation. Commercial tufting needles can be procured that will pass through at least a five inch stack of spaced and layered fabric. The stack of fabric layers is fed into a moving belt system that grips each side of each layer of fabric simultaneously and at a fixed desired spacing from layer to layer. These layers are held taut as the fabric matrix is carried forward through a trough. Fibers are inserted through the stack of layers normal to the fabric surfaces by bottom tufting and the resultant rigidly held three-dimensional matrix is then foamed into a rigid closed cell polyurethane reinforced insulation structure. The art of foaming, per se in making such a structure is well known, since mattresses, seat cushions and many other articles are made for cushioning, insulation and other uses with such foaming techniques.

The bottom of the trough may be paper moving independently or riding on a moving belt or the belt alone may be used if made from a non-sticking elastomer. The sides of the trough will consist of the fabric-gripping moving belts. The top of the channel or trough may or may not be a moving belt. This technique controls the size of the block cross sectional area and will minimize trimming losses. Conventional cutoff and cross-sectional trims can be used as the material leaves the machine.

BRIEF DESCRIPTION OF THE DRAWINGS

FIG. 1 is a schematic representation of the continuous process machine,

FIG. 2 is a sectional view taken along the line 2—2 in FIG. 1, and

FIG. 3 is a perspective view in section of an exemplary insulation material made by the present process and machine.

DETAILED DESCRIPTION OF AN ILLUSTRATIVE EMBODIMENT

Reference is now made to FIG. 1 which is a side view schematically represented. In this view there is shown a plurality of rolls 10, 12, 14, 16, 18 and 20 of a desired reinforcement fabric, gas vapor barrier material, open weave netting or other layers to be imbedded in the foam insulation. In one embodiment rolls 28 inches wide of open weave fabric was desirable. Rollers 22, 24, 26, 28, 30 and 32 position layers 34, 36, 38, 40, 42 and 44 from the rolls in a vertical spaced relationship such that layer 34 is the top layer and layer 44 is the lowermost layer, with the other layers being spaced in between as desired. These layers pass through a trough which forms a pathway between horizontally spaced vertically oriented endless conveyor belts. Conveyor belt 46 is shown in FIG. 1 as the belt on the far side of the fabric layers from the viewer and the endless belt between the viewer and the fabric layers is not shown for purposes of clarity. These endless belts form the sidewalls of the trough and the edge portions of the fabric layers are held and moved by these belts. For example, in co-pending application Ser. No. 402,794, filed Oct. 2, 1973 for Continuous Belt System Holding Multiple Layers there is an illustration how the layer edges may be gripped within slits in the belt and moved along from station to station and then released from the belt at the end. Convex roller 48 at the commencement of the loop in the present application causes the slits to widen to receive these layer edges, after which the slits grip the layers and move them past the various work stations. Convex roller 48 indicates the end of the conveyor belt movement from which the return loop, not shown, commences.

The first step in making a three-dimensional reinforced strip, after the layers are vertically positioned, is to apply vertical stitching through the various layers. This stitching is represented by stitches 50 which are applied at a tufting station represented by tufting needle 52, tufting machine 54 and the spool 56 of tufting thread. A plurality of tufting needles are spaced across the width of the layers so that multiple rows of stitching 50 are applied across the 28 inch wide fabric. Any number of rows and any convenient spacing between the rows may be made as desired. Tufting machines similar to those in the carpet-making industry may be used, modified to tuft through several spaced layers. Various kinds of stitching may be performed at this station as this invention is not limited to the precise configuration of the three-dimensional reinforcement.

After the three-dimensional reinforcement matrix has been made from the layers of fabric and the vertical stitching, the matrix network is then subjected to the foaming operation as represented by the foam input trough 58 and foam pipes 60. Preferably, these pipes extend across the width of the trough between the endless belts and have a plurality of holes in the pipes through which the insulation foam may be extruded. These pipes are connected to a foaming machine 62 which in turn is connected to a foam reservoir supply 64. This foam expands and swells up through the fabric layers between the belts as the belts move the fabric reinforcement matrix down to its next station. As previously mentioned, the foaming operation per se is well known and need not be further described here.

FIG. 2 is a sectional view taken along the line 2—2 of FIG. 3. Here is shown the trough formed by side belts 46, 46A and lower belt 68. Slits 47 and 47A grip the side edges of the various layers to maintain them in spaced relationship, as shown. Multiple rows of vertical stitching 50 pass between the layers. At this point along the production line the foam 70 has risen part way although it will continue to rise to the top as the belts move the composite further along the production line.

Referring back to FIG. 1, upper belt 66 and a lower belt 68 form the top and bottom of the trough and limit the vertical movement of the foam until it has sufficiently cured and stabilized. By limiting the vertical foaming movement, a more dense insulation can be provided if desired. Heat and time usually are the factors which result in the conversion of the foamy substance into an insulation of lightweight, closed cell material 70. Both belts 66 and 68 preferably are of an elastometer having a low chemical adhesion. Most elastometers are natural parting agents and will not adhere to the particular foam used. These belts also may have a spray TFE tetrafluoroethelene fluorol carbon parting agent coating over its surface in order to prevent its adhesion by the polyurethane foam which is preferable as the insulation material. The upper and lower endless belt surfaces 66 and 68 are of sufficient length in the conveyor system that the foaming has solidified sufficiently to become self-supporting. Rollers 72, 74 define the plane of the upper surface and a plurality of rollers 76, 78, 80, 82 and 84 define the lower surface 68. Rollers 86 and 88 are return rollers to the lower belt and rollers 90, 92 are return rollers for the upper belt. Rollers 94, 96 and 98 simply support the return of upper belt 66 and rollers 100, 102, 104, 106, 108, 110 support the return of lower belt 68. Rollers 112, 114 and 116 simply cause appropriate depression in the upper plane of the lower belt to permit foam input pipes 60 at the foaming station to be above the belts and below the lowermost layer 44 of the reinforcement fabric.

After the polyurethane closed cell foam has solidified and become rigid it continues its output movement in the direction of arrow 118. In the illustrative embodiment the thickness of the usable insulation output is on the order of 5 inches and the width is on the order of 2 feet. It may have an infinite length and may be cut into appropriate lengths as desired.

FIG. 3 shows in perspective a portion of the insulative product resulting from the method and apparatus of the present invention. Here is shown the various layers 34, 36, 38, 40, 42 and 44 of reinforcement in spaced relationship with a plurality of rows 50 of loops passing through the layers. The upper ends of these loops may be exposed above the embedding insulation 46, as shown, and may be used in bonding the insulation to a surface to be protected. Alternately, the loops may be completely covered with foam if desired.

Having thus described an illustrative embodiment of the present invention, it is to be understood that modifications thereof will become apparent to those skilled in the art and that these deviations are to be construed as part of the present invention.

I claim:

1. The method of making three-dimensional fiber reinforced insulation comprising the steps of:
   1. positioning several layers of reinforcing material in predetermined vertically stacked and spaced relationship with the layers being in substantially horizontal planes,
   2. passing multiple rows of fibers vertically through said layers with loops under the lowermost layer and over the uppermost layer to form a three-dimensional matrix,
   3. injecting a foamable insulation material into said matrix and allowing it to foam around and through said matrix, and
   4. thereafter cure the resulting composite into a self-supporting structure suitable for adhering to a container.

2. The method as set forth in claim 1 wherein the loops over the uppermost layer are not covered with said insulation.

3. The method as set forth in claim 1 wherein said rows extend longitudinally along the length of the matrix.

4. The method as set forth in claim 1 wherein the side edges of said layers are gripped and moved in passing said layers to a first station where the multiple rows of fibers are passed therethrough and in passing said matrix to another position where the injecting of the foamable insulation material occurs.

5. The method as set forth in claim 1 wherein said layers, matrix and foamable insulation material are moved from station to station for the various operations thereon.

6. Apparatus for making three-dimensional fiber reinforced insulation in accordance with the method of claim 1, said apparatus comprising conveyor means for gripping and moving the several layers in stacked and spaced relationship, tufting machines at a first station for passing multiple loops through the layers as they move past said tufting machines, a foam machine at another station for injecting a foamable insulation material, and side and bottom sections forming a trough which contains said matrix therein and which confines said foamable material until it has stabilized into an insulation material.

7. Apparatus as set forth in claim 6 and, a top section on said trough to limit vertical expansion of said foam and thus provide greater density of said insulation material.

* * * * *